(12) United States Patent
Inomori et al.

(10) Patent No.: US 8,113,329 B2
(45) Date of Patent: *Feb. 14, 2012

(54) FRICTION CLUTCH AND VEHICLE EQUIPPED WITH THE SAME

(75) Inventors: Toshinori Inomori, Shizuoka (JP); Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 632 days.

This patent is subject to a terminal disclaimer.

(21) Appl. No.: 12/274,820

(22) Filed: Nov. 20, 2008

(65) Prior Publication Data

US 2009/0127057 A1 May 21, 2009

(30) Foreign Application Priority Data

Nov. 21, 2007 (JP) .................................. 2007-301716
Oct. 10, 2008 (JP) .................................. 2008-264597

(51) Int. Cl.
*F16D 13/42* (2006.01)

(52) U.S. Cl. .................. 192/70.23; 192/105 B; 192/96; 192/101

(58) Field of Classification Search .................... 192/83, 192/82 P, 105 B, 70.23, 85.5, 96, 35, 85.02, 192/70.11, 101, 89.21, 70.18
See application file for complete search history.

(56) References Cited

U.S. PATENT DOCUMENTS 3,791,499 A * 2/1974 Ryan .......................... 192/70.27
6,957,730 B1 * 10/2005 Youngwerth .................. 192/83

FOREIGN PATENT DOCUMENTS

| JP | 52-4955 | 1/1977 |
| JP | 8-232981 | 9/1996 |
| JP | 3381442 | 2/2003 |

* cited by examiner

*Primary Examiner* — David D Le
*Assistant Examiner* — David J Hlavka
(74) *Attorney, Agent, or Firm* — Dickstein Shapiro LLP

(57) ABSTRACT

A friction clutch includes a clutch housing having a friction plate, a clutch boss having a clutch plate, a pressure plate, a sub clutch, and a power-assist mechanism. An elastic member urges the pressure plate in a predetermined direction to press the friction plate and the clutch plate into frictional contact with each other when the clutch is engaged. The sub clutch includes a friction plate operatively disposed between first and second pressing plates. The power-assist mechanism receives torque from the pressure plate via the sub clutch when the clutch is disengaged and converts the torque into a force for moving the pressure plate in a direction which separates the pressure plate from a plate group.

11 Claims, 8 Drawing Sheets

FRICTION CLUTCH AND VEHICLE EQUIPPED WITH THE SAME

PRIORITY INFORMATION

This patent application is based on and claims priority under 35 U.S.C. §119 to Japanese Patent Application No. 2007-301716, filed on Nov. 21, 2007, and Japanese Patent Application No. 2008-264597, filed on Oct. 10, 2008, the entire contents of which are hereby expressly incorporated by reference.

TECHNICAL FIELD

The present invention relates to a friction clutch and a vehicle equipped with the same.

BACKGROUND ART

Vehicles equipped with a friction clutch for engaging/disengaging the transmission of an engine drive force and a device for operating the friction clutch are well known. An example of a device used to operate a clutch is a clutch lever of a motorcycle.

Generally, as the size of a vehicle becomes larger, the capacity of the friction clutch becomes larger, and the force necessary to disengage the friction clutch also becomes larger. This, however, increases the load required to operate the clutch, which in turn impacts the operational burden on the rider. In order to reduce the load required to operate the clutch, and in turn the operational burden for the rider, a technique for attaching a so-called "power-assist device" to a friction clutch has been suggested, for example, in reference to Japanese Patent Application Publication 52-004955 and Japanese Patent 3381442.

A friction clutch with a power-assist device is disclosed in Japanese Patent 3381442. The friction clutch of Japanese Patent 3381442 includes a counter shaft (rotatable shaft), a clutch release hub (driven side rotating body) provided on the outer circumference of the rotatable shaft, a cylindrical clutch housing (drive side rotating body), which forms a contour of the clutch and has a bottom, a clutch disc (first plate) attached to the drive side rotating body, a clutch plate (second plate) which is attached to the driven side rotating body and is alternately disposed with the first plate, a clutch pressure disc (pressure plate) which presses the first plate and the second plate into contact with each other, an elastic member which biases the pressure plate in a direction in which the first plate and the second plate are pressed into contact with each other, a first clutch push piece (operating shaft) having a rod shape and a second clutch push piece of a substantially cylindrical shape which move the pressure plate in an axial direction of the rotatable shaft, a clutch operation system which moves the operating shaft in the axial direction of the rotatable shaft, a sub clutch including a sub clutch drive disc (pressing member) which rotates together with the drive side rotating body to move in the axial direction of the rotatable shaft, a sub clutch driven disc (torque transmission member) attached to one end of the operating shaft, and a friction member (friction plate) disposed between the pressing member and the torque transmission member in the axial direction of the rotatable shaft. The friction clutch includes a shift mechanism (power-assist device) which moves the pressure plate in a direction reverse to that of a predetermined direction by using torque transmitted by the sub clutch.

The pressure plate is pressed into contact with the outer circumference of the second clutch push piece. The pressing member is pressed into contact with an inner circumference of the second clutch push piece. Therefore, the pressure plate, the second clutch push piece and the pressing member can rotate together with the drive side rotating body. In addition, the pressure plate, the second clutch push piece and the pressing member can rotate together around the axis of rotation of the rotatable shaft. Therefore, the force necessary to disengage the clutch in the clutch operation system is solely the force required to move the pressing member in the axial direction of the rotatable shaft until the pressing member comes into pressure contact with the friction plate of the sub clutch. When the pressing member comes into pressure contact with the friction plate, the torque transmission member transmits torque to the power-assist device which moves the pressure plate in a direction for disengaging the clutch. As described above, the friction clutch can reduce the force necessary to disengage the clutch.

In the friction clutch disclosed in Japanese Patent 3381442, however, rotation of the drive side rotating body is transmitted to the pressing member in the sub clutch through the pressure plate and the second clutch push piece. In other words, the second clutch push piece is interposed between the pressure plate and the sub clutch. Therefore, an extra transmission path intervenes before rotation of the drive side rotating body is transmitted to the sub clutch. In addition, the second clutch push piece has a substantially cylindrical shape. In other words, the second clutch push piece is implemented as a member having a relatively large mass in the axial direction. Therefore, in constituting a transmission path between the pressure plate and the sub clutch, the outer shape requirements for the pressure plate and the pressing member become relatively complicated which complicates in turn the overall structure of the clutch.

SUMMARY

The present invention has been constructed in view of the above-described problems. To this end, it is an object of the present invention to provide a friction clutch with a simplified structure whereby the operational load necessary to disengage the clutch is advantageously decreased.

A friction clutch according to one embodiment of the present invention comprises a drive side rotating body, a driven side rotating body, a pressure plate, an elastic member, a power-assist mechanism, a sub clutch having a friction plate, a pressing member, and a torque transmission member, an operating shaft, and a device for operating the friction clutch.

The drive side rotating body includes a first plate and rotates by means of rotation of the crankshaft of an engine about an axis of rotation. The driven side rotating body is arranged coaxial to the drive side rotating body, has a second plate which is opposed to the first plate in a predetermined direction, and receives torque from the drive side rotating body causing it to rotate when the clutch is engaged. The pressure plate is supported by the drive side rotating body so that the pressure plate is movable in the axial direction with respect to the drive side rotating body and is rotatable together with the drive side rotating body. The pressure plate moves in the predetermined direction along the axis of rotation to press the first plate and the second plate into frictional contact with each other when the clutch is engaged. The elastic member biases the pressure plate in the predetermined direction. The power-assist mechanism receives torque from the pressure plate and converts the torque into a force for moving the pressure plate in a direction away from the predetermined direction so that the first plate and the second plate separate from each other when the pressure member moves in a direction opposite to the predetermined direction.

The friction plate is arranged to rotate coaxially together with the pressure plate. The friction plate has a first friction surface formed on one side and a second friction surface formed on an opposite side. The pressing member comes into contact with the first friction surface and presses the friction plate when the clutch is disengaged. The torque transmission member is disposed opposite to the second friction surface of the friction plate and is pressed into contact with the friction plate by the pressing member to receive torque from the pressure plate and to transmit the torque to the power-assist mechanism when the clutch is disengaged. The operating shaft moves the pressing member from the one side toward the other side. The device for operating the friction clutch employed by the present invention operates the operating shaft to move the pressing member from the one side to the other side.

The friction clutch according the present invention includes a power-assist mechanism. The power-assist mechanism receives torque from the pressure plate and converts the torque into force for moving the pressure plate in a direction in which the first plate and the second plate separate from each other when the clutch is disengaged. Thus, the force necessary to move the pressure plate in a direction in which the first plate and the second plate separate from each other is decreased as a result of employing the power-assist mechanism.

Further, in the friction clutch of the present invention, the friction plate is arranged to rotate together with the pressure plate. The pressure plate is supported on the drive side rotating body so as to be movable in an axial direction with respect to the drive side rotating body and rotate together with the drive side rotating body. The drive side rotating body is configured to rotate in response to rotation of the crankshaft of an engine. Therefore, in the friction clutch according to the present invention, rotation of the crankshaft of the engine is transmitted to the friction plate solely through the drive side rotating body and the pressure plate. Consequently, the friction clutch of the present invention advantageously simplifies the outer shape requirements for the pressure plate and the friction plate when a transmission path is constituted between the pressure plate and the sub clutch.

Therefore, the friction clutch structure can be simplified and the operational load needed to disengage the clutch can be decreased in accordance with the present invention.

BRIEF DESCRIPTION OF THE DRAWINGS

FIG. 7b is a schematic view of balls disposed between a first cam plate of FIG. 7c and the second cam plate of FIG. 7a.

DETAILED DESCRIPTION

Various embodiments of the present invention are described with reference to the accompanying drawings below. For sake of simplifying the description in the following drawings, like elements are denoted by the same reference symbols.

First Embodiment

Hereinafter, a motorcycle 1 having a friction clutch 2 according to a first embodiment of the present invention will be described in detail with reference to the drawings. The motorcycle 1 and the clutch 2 described below are merely examples according to preferred embodiments. A vehicle according to the present invention is not limited to motorcycle 1 described below. A vehicle according to the present invention is also not limited to a conventional motorcycle, such as a motorcycle, a moped, and a scooter, but may include other types of vehicles such as an all terrain vehicle (ATV). Accordingly, the term "motorcycle" as used herein is not to be limited to a two-wheeled vehicle but may also include vehicles having three or more wheels. In other words, in this specification, the term "motorcycle" is intended to generally refer to vehicles that are designed to be tilted when making a turn.

Figure 1:
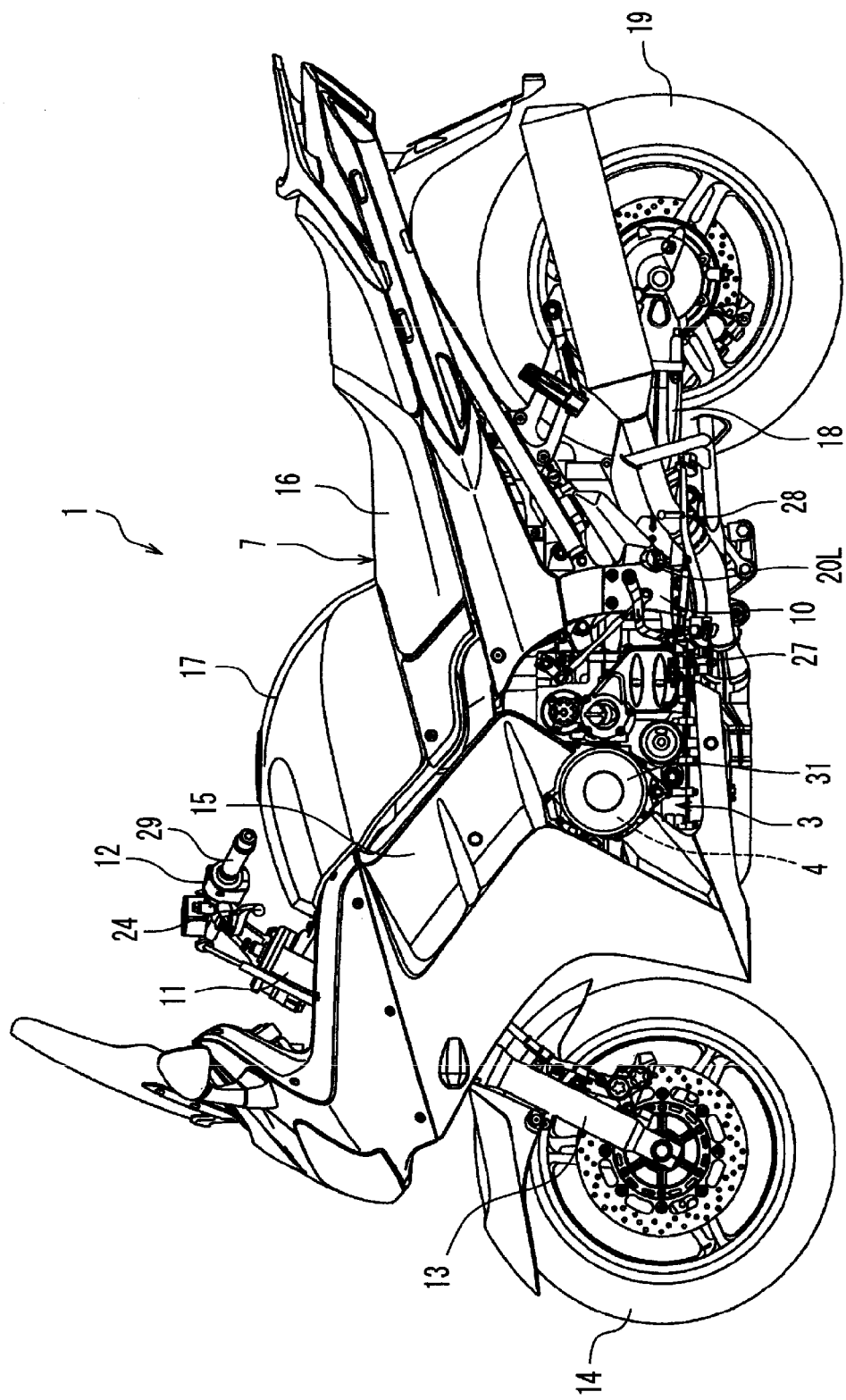
FIG. 1 is a side perspective view of a motorcycle.

FIG. 1 is a left side perspective view illustrating a motorcycle 1 according to the first embodiment of the present invention. In the description below, the terms "front", "back", "left" and "right" refer to directions as viewed from a rider sitting on a seat 16 of motorcycle 1.

Configuration of Motorcycle

As shown in FIG. 1, motorcycle 1 includes a vehicle body 7, a front wheel 14 provided at a front section of the vehicle body 7, and a rear wheel 19 provided at a rear section of the vehicle body 7.

The vehicle body 7 includes a vehicle body frame 10. The vehicle body frame 10 includes a head pipe 11. A handlebar 12 is attached to an upper end of the head pipe 11. The front wheel 14 is rotatably attached to a lower end of the head pipe 11 through a front fork 13.

A power unit 3 is suspended from the vehicle body frame 10. A vehicle body cover 15 is attached to the vehicle body frame 10. Based on a front-rear direction, a seat 16 is disposed so as to extend rearward from a substantially central position of the vehicle body 7. A fuel tank 17 is disposed in front of the seat 16.

A rear arm 18 is pivotally supported on the vehicle body frame 10. The rear wheel 19 is rotatably attached to a rear end of the rear arm 18. The rear wheel 19 is connected to an engine 4 (see FIG. 2) through a power transmission mechanism (not shown). The drive force of the engine 4 is thereby transmitted to the rear wheel 19 so that the rear wheel 19 rotates.

An accelerator grip (not shown) is provided on the right side of the handle 12. A left grip 29 is provided on the left side of the handlebar 12. A clutch lever 24 that is operated to engage/disengage friction clutch 2 (see FIG. 2), which is described later, is provided in front of the left grip 29 of the handlebar 12.

Footrests 20L are provided on each side of the vehicle body 7 at a central portion thereof in the front-rear direction. A shift pedal 27 is operated to change the transmission gear ratio of a transmission 5 (see FIG. 2), which will be described later, is provided on the left side of the vehicle body 7 at a position slightly in front of the left footrest 20L. A side stand 28 is provided on the left side of the vehicle body 7 at a position below the shift pedal 27 and the footrest 20L.

Configuration of Power Unit

Figure 2:
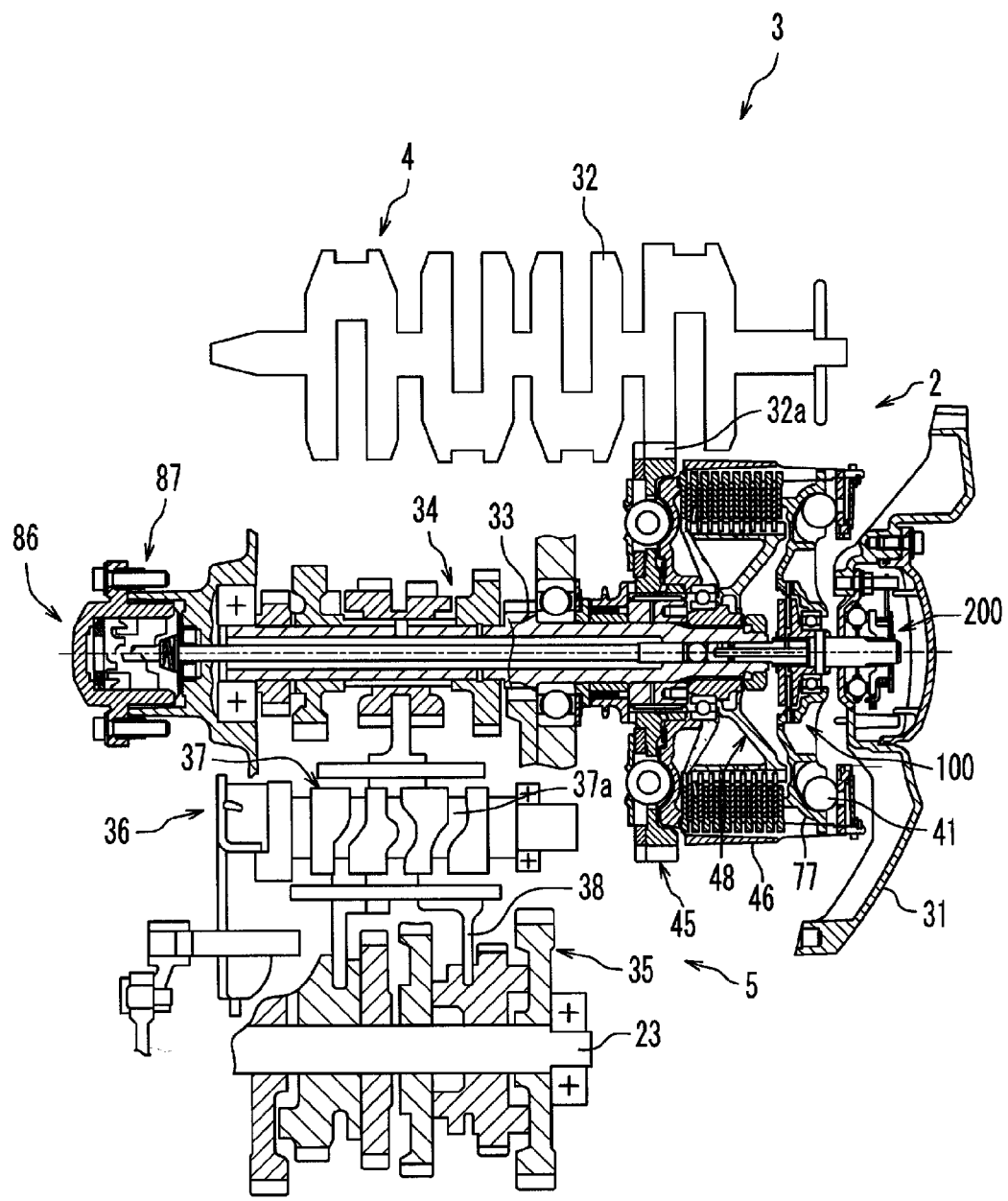
FIG. 2 is a schematic diagram illustrating the main components of a power unit of the motorcycle of FIG. 1 according to a first embodiment of the present invention.

The configurations of the main components of a power unit 3 of motorcycle 1 will now be described with reference to FIG. 2. As shown in FIG. 2, the power unit 3 includes the engine 4, the transmission 5, and the clutch 2. The engine 4 is not limited to a particular type of engine. In the present embodiment of the present invention, a water-cooled, four-cycle, parallel four-cylinder engine is used as the engine 4.

Although not shown, the engine 4 includes four cylinders, a piston reciprocating in each of the respective cylinders, and a crankshaft 32 connected to each of the pistons through a connecting rod. The crankshaft 32 extends in a vehicle width direction. A reference numeral 31 denotes a crankcase.

As shown in FIG. 2, the crankshaft 32 is connected to the transmission 5 through the clutch 2. The transmission 5 includes a main shaft 33, a drive shaft 23, and a gear selection mechanism 36. The main shaft 33 is connected to the crankshaft 32 through the clutch 2. The main shaft 33 and the drive shaft 23 are disposed parallel to the crankshaft 32, respectively.

A plurality of multi-stage transmission gears 34 are mounted on the main shaft 33. A plurality of transmission gears 35 corresponding to the multi-stage transmission gears 34 are mounted on the drive shaft 23. The multi-stage transmission gears 34 and the plurality of transmission gears 35 are disposed so that only one pair of selected gears are engaged with each other. Either the transmission gears 34 excluding the selected transmission gear 34 or the transmission gears 35 excluding the selected transmission gear 35 are rotatable with respect to the main shaft 33 or the drive shaft 23 or both. That is, at least one of the non-selected transmission gears 34 or the non-selected transmission gears 35 run idle with respect to the main shaft 33 or the drive shaft 23. In other words, rotation is transmitted between the main shaft 33 and the drive shaft 23 only by the selected transmission gear 34 and the selected transmission gear 35 which are engaged with each other.

The transmission gears 34 and 35 are selected by the gear selection mechanism 36. Specifically, the transmission gears 34 and 35 are selected by a shift cam 37 of the gear selection mechanism 36. A plurality of cam grooves 37a are formed on an outer circumferential surface of the shift cam 37. A shift fork 38 is engaged with each cam groove 37a. Each shift fork 38 is engaged with predetermined transmission gears 34 and 35 of the main shaft 33 and the drive shaft 23, respectively. As the shift cam 37 rotates, shift forks 38 are guided in their respective cam grooves 37a to move in a direction of the main shaft 33, so that gears which are engaged with each other are selected from the transmission gears 34 and 35. Specifically, among the multi-stage transmission gears 34 and the plurality of transmission gears 35, only one pair of gears disposed at positions corresponding to a rotational angle of the shift cam 37 are fixed with respect to the main shaft 38 and the drive shaft 23 by a spline. As a result, the transmission gear position is determined, and rotation between the main shaft 33 and the drive shaft 23 is transmitted at a predetermined transmission gear ratio through the transmission gears 34 and 35. The gear selection mechanism 36 is operated by the shift pedal 27 shown in FIG. 1.

In the above-mentioned configuration, after a pair of transmission gears 34 and 35 is fixed to the main shaft 33 and the drive shaft 23 and the clutch 2 is engaged, when the engine 4 is driven a drive force of the engine 4 is transmitted to the main shaft 33 through the clutch 2. The rotation is transmitted at a predetermined transmission gear ratio between the main shaft 33 and the drive shaft 23 through a pair of transmission gears 34 and 35, so that the drive shaft 23 is driven to rotate. When drive shaft 23 is driven to rotate, drive force is transmitted by a transmission mechanism (not shown) such as a chain connecting the drive shaft 23 and the rear wheel 19, so that the rear wheel 19 is rotated. In the embodiment of the present invention, a power transmission mechanism which connects the engine 4 and the rear wheel 19 comprises the clutch 2, the transmission 5 and a transmission mechanism (not shown) such as a chain.

Configuration of Clutch

In the embodiment of the present invention, the clutch 2 comprises a friction clutch of the wet multi-plate type. The clutch 2 is a centrifugal clutch which is automatically engaged/disengaged in starting or stopping motorcycle 1 and which is optionally engaged/disengaged by the clutch lever 24 operated by a rider. A configuration of the clutch 2 will be described below with reference to FIGS. 2, 3 and 4.

Clutch Housing 46

Figure 3:
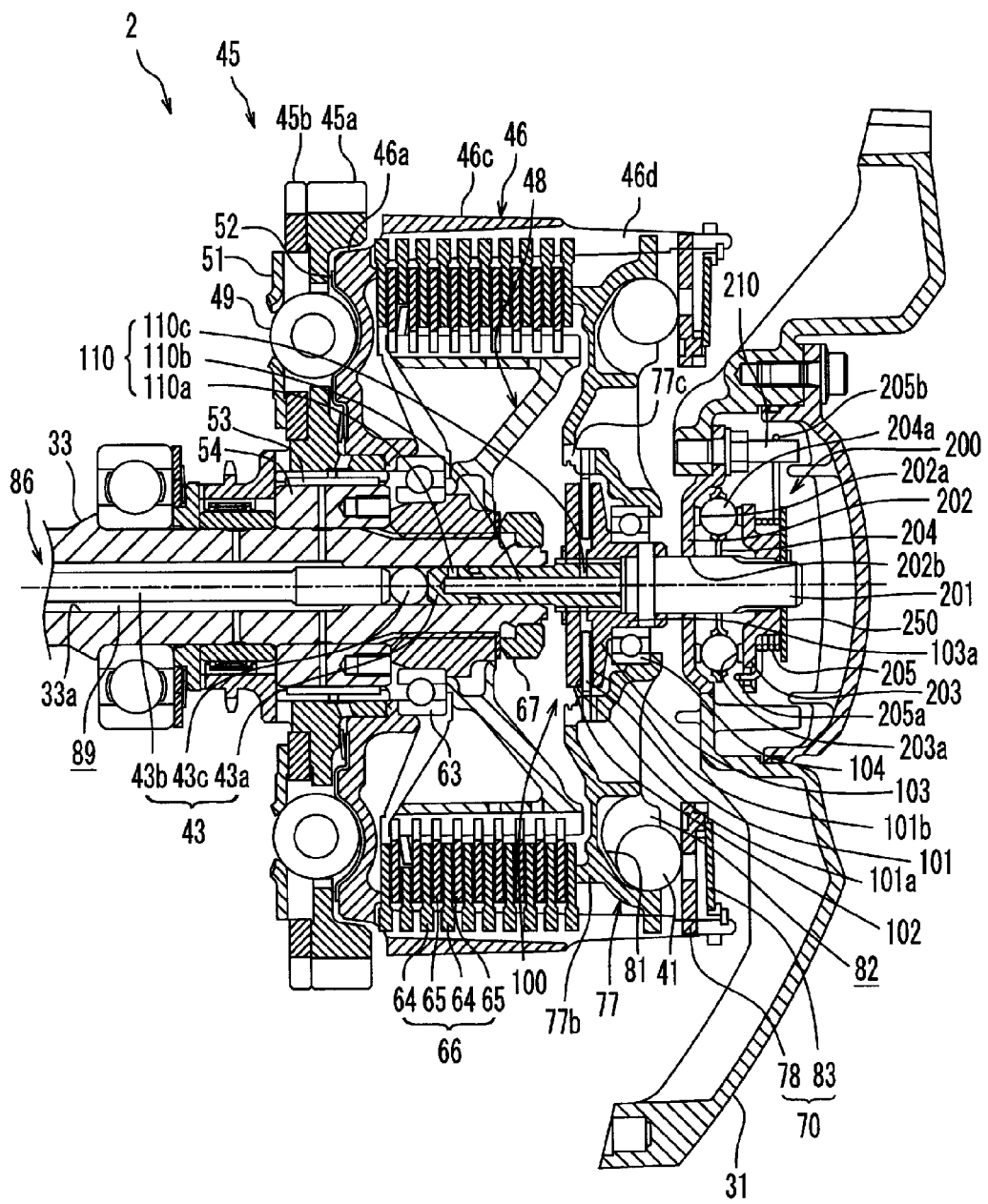
FIG. 3 is a cross-sectional view illustrating a clutch according to a first embodiment of the present invention.

As shown in FIG. 3, the clutch 2 includes a clutch housing 46. The main shaft 33 passes through the clutch housing 46. The clutch housing 46 includes a housing body 46c. The housing body 46c is formed in a substantially cylindrical form that is closed at one end by a bottom 46a. The main shaft 33 also extends through the bottom 46a of the housing body 46c. A plurality of pairs of arms 46d are provided on the housing body 46c. Each arm 46d extends outward from the bottom 46a toward the outside in a vehicle width direction.

As shown in FIG. 3, a vehicle width direction may be also referred to as a left-right direction. In the embodiment of the present invention, the clutch 2 is disposed on the right side of the main shaft 33. Thus, "outside" in the vehicle width direction corresponds to the right side, and "inside" in the vehicle width direction corresponds to the left side. Therefore, the "outside" and the "inside" in the vehicle width direction will be referred to as simply as the "right side" and the "left side," respectively.

Scissor Gear 45

A scissor gear 45 is attached to the clutch housing 46. The scissor gear 45 includes two gears 45a and 45b, a spring 49, and two plates 51 and 52. The gear 45a and the gear 45b are located between the two plates 51 and 52. The two plates 51 and 52 are fixed to each other in the axial direction of the main shaft 33 with fixing parts such as rivets or screws. Therefore, the two gears 45a and 45b are substantially fixed to each other with respect to the axial direction of the main shaft 33. Meanwhile, the gears 45a and 45b are rotatable with respect to a rotational direction.

The gears 45a and 45b have the same number of teeth. The gears 45a and 45b are arranged so that their teeth are alternately located in a circumferential direction. The spring 49 is provided between the gears 45a and 45b. Therefore, the gears 45a and 45b receive torque supplied by the spring 49. Thus, the torque variations caused by the engine 4 can be absorbed.

The gear 45a of the scissor gear 45 is engaged with a gear 32a (FIG. 2) of the crankshaft 32. The gear 45a (of the scissor gear 45) is fixed to the bottom 46a of the clutch housing 46 so as to be unrotatable relative thereto. With such a configuration, the gear 45a of the scissor gear 45 and the clutch housing 46 integrally rotate following the rotation of the crankshaft 32.

A needle bearing 53 and a spacer 54, which is nonrotatably fixed to the main shaft 33, are disposed between the scissor gear 45 and the main shaft 33. The needle bearing 53 makes the scissor gear 45 rotatable with respect to main shaft 33. In other words, rotation of the scissor gear 45 is not transmitted directly to the main shaft 33.

Clutch Boss 48

A clutch boss 48 is nonrotatably fixed to the main shaft 33 by a nut 67. That is, the clutch boss 48 rotates together with the main shaft 33. A thrust bearing 63 is disposed between the clutch boss 48 and the scissor gear 45. Thus, the thrust bearing 63 prevents the gaps between each of scissor gear 45, the needle bearing 53, the spacer 54, and the clutch boss 48 from becoming smaller than a predetermined distance. In other words, movement of the scissor gear 45, the needle bearing 53, and the spacer 54 toward the clutch boss 48 in the axial direction of the main shaft 33 is restricted.

Plate Group 66

A plurality of friction plates 64 are arranged inside the clutch housing 46. Each friction plate 64 is fixed to the clutch housing 46 with respect to the rotational direction of the main shaft 33. Thus, the plurality of friction plates 64 rotate together with the clutch housing 46. Each friction plate 64 is displaceable in the axial direction of the main shaft 33. Thus, the distance between two adjacent friction plates 64 is variable.

The plurality of friction plates 64 are arranged in the axial direction of the main shaft 33. Each clutch plate 65 is disposed between adjacent friction plates 64. The clutch plate 65 is opposed to the adjacent friction plates 64. Each clutch plate 65 is fixed to the clutch boss 48 with respect to the rotational direction of the main shaft 33. Thus, the plurality of clutch plates 65 rotate together with the clutch boss 48. Further, each clutch plate 65 is displaceable with respect to the axial direction of the main shaft 33. Thus, the distance between mutually adjacent clutch plates 65 is variable.

In the present embodiment, a plate group 66 comprised of the plurality of friction plates 64 and the plurality of clutch plates 65, as shown in FIG. 3.

Pressure Plate 77

A pressure plate 77 is arranged on the right side of the main shaft 33, as depicted in reference to FIG. 3. The pressure plate 77 is formed into a substantially disc shape. A sub clutch 100, to be described later, is provided at a central portion of the pressure plate 77. A radially outward end of the pressure plate 77 is engaged with arms 46d. Therefore, the pressure plate 77 is not rotatable with respect to the clutch housing 46 but it rotates together with the clutch housing 46.

A pressing portion 77b that projects toward the plate group 66 is formed on the pressure plate 77 at an outer section thereof, as illustrated in FIG. 3. The pressing portion 77b faces the rightmost friction plate 64 in the plate group 66. When the pressure plate 77 moves leftward, the pressing portion 77b pushes the plate group 66 leftward. As a result, the friction plates 64 and the clutch plates 65 in the plate group 66 are pressed into frictional contact with each other.

A plurality of cam surfaces 81, each of which supports a roller weight 41, are formed on a surface opposite to the plate group 66 in the radially outward portion of the pressure plate 77. The plurality of cam surfaces 81 and the plurality of roller weights 41 are provided along the circumferential direction. The plurality of cam surfaces 81 are arranged radially about the longitudinal axis of the main shaft 33. Each cam surface 81 is inclined rightward as it moves outward in the radial direction.

A roller retainer 78 is disposed on the right side of the pressure plate 77. The roller retainer 78 is formed in a shape of a orbicular zone when viewed from the axial direction of the main shaft 33. The roller retainer 78 is opposed to the cam surface 81 of the pressure plate 77. Therefore, a space 82 that becomes narrower in the radial direction of the main shaft 33 is formed by each cam surface 81 and the roller retainer 78.

Similar to the pressure plate 77, a radially outward end of the roller retainer 78 is engaged with the plurality of arms 46d. The roller retainer 78 is thereby nonrotatable about the clutch housing 46. In other words, the roller retainer 78 rotates together with the clutch housing 46. Meanwhile, the roller retainer 78 is displaceable with respect to the clutch housing 46 in the axial direction of the main shaft 33.

The roller retainer 78 is urged leftward by a disc spring 83 which serves as a biasing member. In other words, the roller retainer 78 is urged toward the plate group 66 by disc spring 83. The roller retainer 78 and the disc spring 83 constitute an abutment member 70 that presses the roller weights 41 toward the cam surface 81.

A roller weight 41 is provided in each of a plurality of spaces 82. The roller weight 41 revolves following the rotation of the clutch housing 46 and moves on the cam surface 81 radially outward by means of a centrifugal force generated during the revolution. The roller weight 41 receives a reaction force from the abutment member 70 and presses the pressure plate 77 toward the plate group (66) side.

When the rotational speed of the crankshaft 32 is lower than a predetermined value, such as an idling state, the rotational speed of the clutch housing 46 also becomes lower. Therefore, centrifugal force applied to the roller weight 41 is relatively small, and so the roller weight 41 is located relatively inward. Therefore, the force which the roller weight 41 presses the pressure plate 77 to the left becomes substantially zero. As a result, the plate group 66 enters a substantially non-contact state where it is not pressed by the pressure plate 77. Therefore, rotation of the clutch housing 46 is not transmitted to the clutch boss 48. In other words, the clutch 2 enters a disengaged state.

When the rotational speed of the crankshaft 32 increases, the rotational speed of the clutch housing 46 increases accordingly. As the rotational speed of the clutch housing 46 increases, the centrifugal force applied to the roller weights 41 also increases. If the centrifugal force applied to the roller weights 41 is equal to or more than a predetermined value, the roller weights 41 move outward. The pressure plate 77 is thereby pressed toward the left side by the roller weights 41 and moves toward the plate group 66. As a result, the plate group 66 is placed in a frictional contact state and the clutch 2 enters an engaged state.

When the plate group 66 is in a pressed-contact state and the clutch 2 is engaged as described above, the rotation of the clutch housing 46 is transmitted to the clutch boss 48 through the plate group 66. As a result, the clutch boss 48 rotates together with the clutch housing 46.

If the rotational speed of the crank shaft 32 decreases while the clutch 2 is in the engaged state, the centrifugal force applied to the roller weights 41 is reduced. Therefore, the roller weights 41 move inward in the radial direction. As a result, the force applied by the pressure plate 77 to press the plate group 66 is reduced to substantially zero and the state of the clutch 2 is changed to the disengaged state.

As described above, the motorcycle 1 is provided with the centrifugal clutch 2. Therefore, when the vehicle starts or stops, the clutch 2 is automatically engaged or disengaged in accordance with the rotational speed of the engine 4, and it is unnecessary to operate the clutch lever 24. Therefore, in the motorcycle 1 according to the first embodiment, the burden of operation placed on the driver during starting or stopping the motorcycle can be reduced.

Sub Clutch 100

As shown in FIG. 3, the clutch 2 according to the present embodiment includes a sub-clutch 100. The sub-clutch 100 includes a friction plate 101, a first pressing plate 102 that faces a left surface (hereinafter, "first friction surface") 101a of the friction plate 101, and a second pressing plate 103 that faces a right surface (hereinafter, "second friction surface") 101b of the friction plate 101.

The friction plate 101 is engaged with the pressure plate 77 so as to rotate together with the pressure plate 77. Specifically, one or more slide arm sections 77c are formed on the pressure plate 77. One or more corresponding grooves (not shown) are formed on a radially outward side of the friction plate 101. Each groove (of the friction plate 101) is slidably engaged with a slide arm section 77c, whereby the friction plate 101 rotates together with the pressure plate 77.

The first pressing plate 102 is fixed to a short push rod 43a, which will be described below. Therefore, the first pressing plate 102 moves together with the short push rod 43a in the axial direction of main shaft 33. In addition, the first pressing plate 102 rotates together with the short push rod 43a.

The second pressing plate 103 is fitted onto the short push rod 43a by way of matching serrated surfaces. Thus, the second pressing plate 103 rotates together with the short push rod 43a but is movable relative to the short push rod 43a in the axial direction of main shaft 33. The second pressing plate 103 includes a boss 103a extending rightward. This boss 103a rotatably supports the pressure plate 77 via a bearing 104. The second pressing plate 103 and the pressure plate 77 are thereby relatively rotatable about each other. Furthermore, the second pressing plate 103 and the pressure plate 77 are configured to move integrally in the axial direction of main shaft 33.

When the short push rod 43a moves rightward, the first pressing plate 102 also moves rightward. The first pressing plate 102 presses the friction plate 101 against the second pressing plate 103 accordingly. As a result, the friction plate 101 is sandwiched between the first pressing plate 102 and the second pressing plate 103. A torque of the pressure plate 77 is thereby transmitted to the first pressing plate 102 and the second pressing plate 103 via the friction plate 101.

As described later, a through-hole 33a is formed within the main shaft 33. The short push rod 43a, a ball 43c, and a long push rod 43b of a push mechanism 43 are inserted into the through-hole 33a. A gap 89 between an inner wall of the through-hole 33a and the long push rod 43b serves as an oil supply path for supplying oil to the clutch 2.

Moreover, an oil supply path 110 that guides the oil in the gap 89 to the sub clutch 100 is formed in the short push rod 43a. The oil supply path 110 is configured to include an oil introduction path 110a formed in a left portion of the short push rod 43a, an oil path 110b formed at a central portion of the short push rod 43a, and an oil discharge path 110c formed in a right portion of the short push rod 43a. The oil introduction path 110a comprises a hollow conduit extending in the radial direction and connected to the oil path 110b extending in an axial direction of main shaft 33. Likewise, the oil lead-out path 110c comprises a hollow conduit extending radially and connected to the oil path 110b. An outlet of the oil discharge path 110c, that is, the radially outward opening of the oil discharge path 110c, is open toward the first friction surface 101a and the second friction surface 101b of the friction plate 101. Thus, the oil on the oil supply path 110 is supplied toward the first friction surface 101a and the second friction surface 101b.

Power-Assist Mechanism

As shown in FIG. 3, the clutch 2 according to the present embodiment includes a power assist mechanism 200. The power-assist mechanism 200 converts part of the torque of the pressure plate 77 into a force for disengaging the clutch 2 so as to reduce the force required to disengage the clutch 2. The power-assist mechanism 200 according to the present embodiment comprises a so-called ball cam. Particularly, the power-assist mechanism 200 includes a slide shaft 201 fixed to the second pressing plate 103, a first cam plate 202, a second cam plate 203, a ball plate 204, and a coil spring 205 that biases the second cam plate 203 in a direction which separates the second cam plate 203 from the first cam plate 202. A support plate 250 that supports the coil spring 205 by abutting a right portion of the coil spring 205 is fixed onto a terminal side of the slide shaft 201.

Figure 5A:
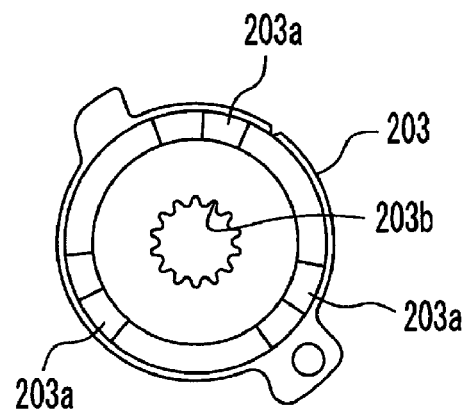
FIG. 5a is a rear view illustrating a second cam plate of a power-assist mechanism according to the first embodiment of the present invention.
Figure 5B:
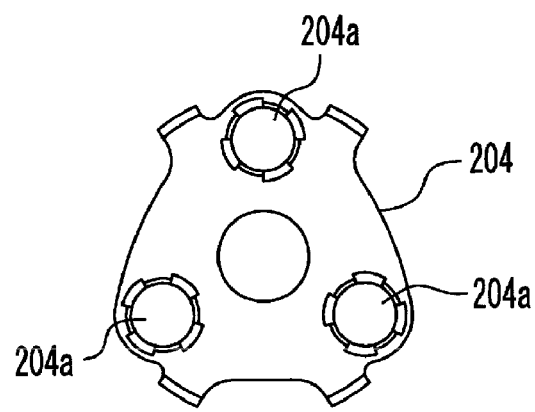
FIG. 5b is a front view illustrating a ball plate of the power-assist mechanism according to the first embodiment of the present invention.

As shown in FIG. 5(b), three balls 204a are rollably supported on the ball plate 204. The three balls 204a are arranged equidistantly in a circumferential direction about a longitudinal axis of the slide shaft 201. However, the number of balls 204a supported on ball plate 204 does not have to be limited to three. Other ball cam configurations may be utilized as needed.

Figure 5C:
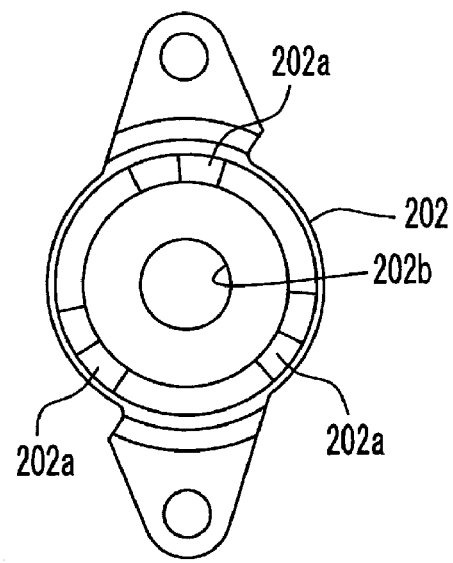
FIG. 5c is a front view illustrating a first cam plate of the power-assist mechanism according to the first embodiment of the present invention.

As shown in FIG. 5(c), a through-hole 202b is formed at a central portion of the first cam plate 202. As shown in FIG. 3, the slide shaft 201 is inserted through the through-hole 202b. The slide shaft 201 is movable axially with respect to the first cam plate 202 and rotatable with respect to the first cam plate 202. That is, the first cam plate 202 is configured not to rotate even if the slide shaft 201 rotates.

As shown in FIG. 5(a), a serrated hole 203b is formed at a central portion of the second cam plate 203. The second cam plate 203 is fitted onto a corresponding serrated portion of the slide shaft 201. Thus, the second cam plate 203 is axially movable with respect to the slide shaft 201 and rotates together with the slide shaft 201.

One end 205a of the coil spring 205 is secured to the second cam plate 203. The other end 205b of the coil spring 205 is secured to a pin 210 fixed to the crankcase 31. Therefore, the second cam plate 203 receives a torque from the coil spring 205 that urges the second cam plate 203 to rotate around the slide shaft 201 in a predetermined direction discussed below. In addition, the second cam plate 203 receives a slide force, depending on a total biasing force applied by the disc spring 83 and the coil spring 205, which urges the second cam plate 203 to move toward the first cam plate 202 in the axial direction of the slide shaft 201.

First cam surfaces 202a are formed on the right side of the first cam plate 202 (or the front side of the sheet in FIG. 5c). Second cam surface 203a are formed on the left side of the second cam plate 203 (or see the front side of the sheet in FIG. 5a). The first cam surfaces 202a and the second cam surfaces 203a are shaped such that the balls 204a move out of spaces formed by opposing valleys, or low spots, on the cam surfaces 202a and 203a and ride up on opposing cam lobes of cam surfaces 202a and 203a when the second cam plate 203 rotates in a predetermined direction. The balls 204a then return to the spaces formed by the opposing valleys of cam surface 202a and 203a when the second cam plate 203 rotates in a reverse direction opposite to the predetermined direction. In other words, the cam surface 202a and 203a are shaped such that, when the second cam plate 203 rotates in the predetermined direction against the total biasing force applied by the disc spring 83 and the coil spring 205, the plates 202 and 203 are pushed away from each other by the balls 204a so that the second cam plate 203 is moved rightward. In addition, the cam surface 202a and 203a are shaped such that, when the second cam plate 203 rotates in the reverse direction, the second cam plate 203 moves leftward due to the total biasing force applied by the disc spring 83 and the coil spring 205.

Clutch Release Mechanism 86

The clutch 2 according to the present embodiment includes a clutch release mechanism 86 (FIG. 3). The clutch release mechanism 86 forcibly releases a pressed-contact state of the plate group 66 in response to the operation of the clutch lever 24 by a rider. Clutch release mechanism 86 enables the clutch 2 to be disengaged by the manual operation of a rider of the motorcycle 1.

The clutch release mechanism 86 includes the push mechanism 43 (see FIG. 3) and a drive mechanism 87 (see FIG. 4) for driving the push mechanism 43. As shown in FIG. 3, the push mechanism 43 includes the short push rod 43a, the long push rod 43b, and the ball 43c interposed between the short push rod 43a and the long push rod 43b. The through-hole 33a is formed in the main shaft 33 and the push mechanism 43 is arranged within the through-hole 33a. It should be noted that the through-hole 33a also serves as an oil supply path for supplying the oil to the respective sliding portions or the like of the clutch 2. Specifically, the oil is supplied to the respective sliding portions of the clutch 2 via the gap 89 between the inner wall of the through-hole 33a and the push mechanism 43.

A right end of the short push rod 43a protrudes from the main shaft 33 and is attached to the first pressing plate 102 of the sub clutch 100. Thus, when the sub clutch 100 is engaged, the short push rod 43a rotates with the pressure plate 77. Further, when the sub clutch 100 and the clutch 2 are engaged, the short push rod 43a rotates in response to rotation of the clutch housing 46. On the other hand, the long push rod 43b does not rotate together with the main shaft 33. Thus, the ball 43c is provided between the short push rod 43a and the long push rod 43b to reduce the sliding resistance between the short push rod 43a and the long push rod 43b.

Figure 4:
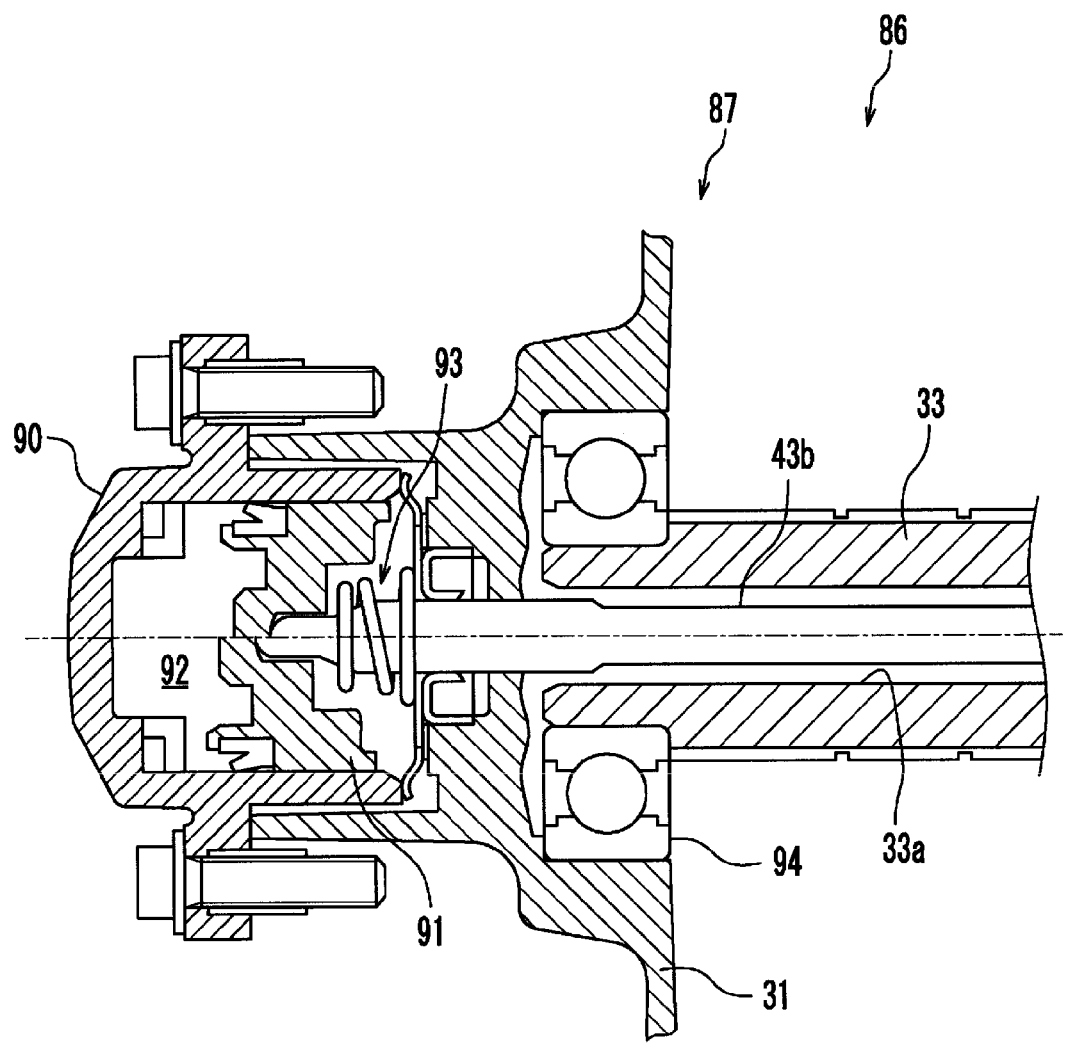
FIG. 4 is a cross-sectional view illustrating a push rod drive mechanism that may be used to disengage the clutch.

FIG. 4 is a cross-sectional view showing the push rod drive mechanism 87. As shown in FIG. 4, the left end of the long push rod 43b extends to the push rod drive mechanism 87. In FIG. 4, the section below the longitudinal axis of the main shaft 33 represents the state in which the clutch release mechanism 86 is not being driven. In other words, the section below the longitudinal axis of the main shaft 33 in FIG. 4 represents the state in which the push mechanism 43 is shifted relatively to the left and the pressure plate 77 is not displaced rightward by the push mechanism 43. On the other hand, the section above the longitudinal axis of the main shaft 33 in FIG. 4 represents the state in which the clutch release mechanism 86 is being driven. In other words, the section above the longitudinal axis of the main shaft 33 represents the state in which the push mechanism 43 is shifted relatively to the right and the pressure plate 77 is displaced rightward by the push mechanism 43.

As shown in FIG. 4, the drive mechanism 87 includes a cylinder 90 and a piston 91. The piston 91 is slidable within the cylinder 90 in the axial direction of the main shaft 33. The piston 91 is attached to the long push rod 43b. Thus, when the piston 91 slides, the long push rod 43b also moves in the axial direction of the main shaft 33.

An operating chamber 92 is defined and formed between the piston 91 and the inner wall of cylinder 90. The operating chamber 92 is filled with oil.

A helical compression spring 93 is disposed between the piston 91 and the crankcase 31. The piston 91 is urged leftward in FIG. 4 away from the crankcase 31 by the helical compression spring 93. In other words, the piston 91 is urged in the direction in which the push mechanism 43 is displaced leftward to engage the clutch 2. Thus, when a rider of the motorcycle 1 releases the operation of the clutch lever 24 (FIG. 1), the push mechanism 43 automatically moves leftward.

Operation of Clutch

The operation of the clutch 2 will now be described. First, an operation for causing the clutch 2 to be disengaged will be described.

When a rider of the motorcycle 1 grasps the clutch lever 24 (see FIG. 1), the internal pressure of the operating chamber 92 of the drive mechanism 87 rises. The piston 91 thereby moves rightward (in FIG. 4) and the long push rod 43b also moves rightward. The ball 43c and the short push rod 43a thereby move to the right and the first pressing plate 102 of the sub clutch 100 moves rightward. The friction plate 101 of the sub clutch 100 is thereby sandwiched between the first pressing plate 102 and the second pressing plate 103, so that the sub clutch 100 enters an engaged state. The slide shaft 201 of the power assist mechanism 200 thereby rotates with the pressure plate 77 in a predetermined direction.

If the slide shaft 201 rotates in the predetermined direction, the second cam plate 203 of the power-assist mechanism 200 also rotates in the same direction. Thus, the balls 204a on the ball plate 204 move out of the spaces formed by opposing valleys on the surfaces 202a and 203a and ride up on opposing cam lobes of cam surfaces 202a and 203a. The second cam plate 203 is thus pushed to the right by the balls 204a. Therefore, the slide shaft 201 is also pushed to the right. As a result, the pressure plate 77 moves to the right by a force by which the short push rod 43a presses the pressure plate 77 rightward via the first pressing plate 102 and the friction plate 101 and a force by which the slide shaft 201 pulls the pressure plate 77 rightward via the second pressing plate 103 and the bearing 104. Accordingly, the pressed-contact state of the disc group 66 is thereby released to disengage the clutch 2.

It should be noted that rotation of the second cam plate 203 is restricted so as not to exceed a predetermined amount. For this reason, in the state in which the clutch 2 is disengaged, the friction plate 101 rotates with respect to the first pressing plate 102 and the second pressing plate 103. That is, the friction plate 101 slides with respect to the first pressing plate 102 and the second pressing plate 103. However, since the oil is supplied to the first friction surface 101a and the second friction surface 101b of the friction plate 101, wear of the friction plate 101 is suppressed.

Next, an operation for engaging the clutch 2 will be described.

In order to engage the clutch 2, a rider lets go of his or her hold of the clutch lever 24. The internal pressure of the operating chamber 92 of the drive mechanism 87 thereby decreases. Accordingly, the piston 91 and the long push rod 43b move leftward in FIG. 4. The ball 43c and the short push rod 43a also move to the left and the first pressing plate 102 of the sub clutch 100 move to the left. Due to this, the first pressing plate 102 of the sub clutch 100 separates from the friction plate 101. Further, the second pressing plate 103 is not pressed rightward by the first pressing plate 102. Consequently, a rightward pressing force against the slide shaft 201 is eliminated and the second cam plate 203, which receives the biasing force of the coil spring 205, rotates in the reverse direction, whereby the second cam plate 203 and the slide shaft 201 move to the left. As a result, the second pressing plate 103 also moves to the left.

Moreover, because the rightward pressing force applied by the first pressing plate 102 has been removed, the pressure plate 77 moves leftward by the biasing force of the disc spring 83. As a result, the plate group 66 is pressed into frictional contact with each other by the pressure plate 77 so that the clutch 2 is engaged. At this time, the friction plate 101 of the sub clutch 100 separates from the second pressing plate 103.

In the clutch 2 according to the first embodiment of the present invention, the biasing force applied to the pressure plate 77 by the disc spring 83 varies according to the radial position of the roller weights 41. Specifically, when the rotational speed of the pressure plate 77 is high, the roller weights 41 move outward in a radial direction. As a result, the roller weights 41 move rightward to greatly deform the disc spring 83. Therefore, the biasing force which the pressure plate 77 receives from the disc spring 83 increases relatively because the disc spring 83 is greatly deformed by the roller weights 41. As a result, large biasing forces can be achieved without the need to set a high coefficient of elasticity of the disc spring 83. Thus, the biasing force applied to the pressure plate 77 by the disc spring 83 becomes relatively large. Meanwhile, if a rotational speed of the pressure plate 77 is low, the roller weights 41 move inward in the radial direction. As a result, the roller weights 41 move leftward and the deformation of the disc spring 83 decreases. Therefore, the biasing force the pressure plate 77 receives from the disc spring 83 becomes relatively small.

When the rotational speed of the engine is high, the pressure plate 77 presses the plate group 66 into contact with each other with a large pressing force. In the clutch 2 according to the present embodiment, when the rotational speed of the engine increases, the roller weights 41 move outward in a radial direction and the amount of deformation of the disc spring 83 increases accordingly. Thus, a sufficiently large pressing force can be obtained without increasing the coefficient of elasticity of the disc spring 83 to a high value. Therefore, the elastic coefficient of the disc spring 83, that is, the spring capacity, can be relatively small.

When rotating at a low speed such as in the idling state, the roller weights 41 move inward in the radial direction and clutch enters the state in which the pressure plate 77 does not press the plate group 66 into contact with each other. In other words, the clutch is disengaged. When the rotational speed of the engine increases from that in the idling state, the roller weights 41 move outward in the radial direction and the pressure plate 77 presses the plate group 66 into frictional contact with each other. In other words, the clutch becomes engaged. In the clutch 2 according to the present embodiment, because the elastic coefficient of the disc spring 83 is relatively small, at the time when the clutch becomes engaged, the rotational speed of the engine is not required to be very high and the amount of deformation of the disc spring 38 is relatively small. Therefore, the force applied by the pressure plate 77 so as to press the plate group 66 is relatively weak. Thus, the plate group 66 is not abruptly pressed into contact with each other and the clutch 2 is smoothly engaged.

Effect of First Embodiment

As described above, according to the first embodiment of the present invention, the clutch 2 includes a power-assist mechanism 200 and so can reduce the force necessary for disengaging the clutch 2. The clutch 2 also includes one or more roller weights 41 which move outward in a radial direction by a movement amount according to the magnitude of centrifugal force and presses the pressure plate 77 toward the plate group 66 with force according to the movement amount. Therefore, if the engine speed is high, the roller weights 41 move outward in a radial direction, so that the force with which the pressure plate 77 presses the plate group 66 into contact with each other can be made relatively large. Thus, even though the engine speed is high, slipping in the plate group 66 can be prevented, and the power transmission efficiency of the clutch 2 can be improved. Meanwhile, if an engine speed is low, the roller weights 41 move inward in a radial direction, so that the force with which the pressure plate 77 presses the plate group 66 into contact with each other can be kept relatively small. Therefore, the shift shock which occurs when the clutch 2 is engaged in an idling state can be reduced. Therefore, the clutch 2 according to the present embodiment can reduce not only the operational load for disengaging the clutch but also the shift shock which occurs when the clutch 2 is engaged in an idling state.

According to the first embodiment of the present invention, the pressure plate 77 is supported by or connected to the clutch housing 46 to rotate together with the clutch housing 46. The cam surfaces 81 which guide the roller weights 41 rightward as they moves further outward in the radial direction are formed on a right surface section of the pressure plate 77. The clutch 2 includes an abutment member 70 that presses the roller weights 41 toward the cam surface 81 of pressure plate 77. The roller weights 41 receive a reaction force from the abutment member 70 and press the pressure plate 77 toward the plate group 66.

The pressure plate 77 presses the plate group 66 into contact with each other. The pressure plate 77 also supports and guides the roller weights 41. Therefore, there is no need for separately providing a member for pressing the plate group 66 into contact with each other and a member for supporting and guiding the roller weights 41. Accordingly, according to the first embodiment of the present invention, the number of components of the clutch 2 can be decreased, and it is possible to make the clutch 2 more compact.

In addition, according to the first embodiment of the present invention, the clutch 2 includes a sub clutch 100. The sub clutch 100 includes the friction plate 101 provided to rotate together with the pressure plate 77, the first pressing plate 102 which comes into contact with the first friction surface 101a of the friction plate 101 when the clutch is disengaged to press the friction plate 101 to the right, and the second pressing plate 103 which comes into contact with the second friction surface 101b of the friction plate 101 when the clutch is disengaged and is pressed into contact with the friction plate 101 to receive torque from the pressure plate and transmits the torque to the power-assist mechanism 200.

As described above, the friction plate 101 includes the two friction surfaces 101a and 101b. Therefore, torque can be efficiently transmitted to the power-assist mechanism 200 from the pressure plate 77.

In the first embodiment of the present invention, the sub clutch 100 is disposed between the clutch boss 48 and the abutment member 70 with respect to an axial direction of the main shaft 33. That is, a space between the clutch boss 48 and the abutment member 70 is effectively used as an installation space for the sub clutch 100. Therefore, it is possible to make the clutch 2 more compact.

Further, the clutch 2 according to the present embodiment includes a main shaft 33 supported by or connected to the clutch boss 48 to rotate according to the clutch boss 48, and the through hole 33a which extends in an axial direction is formed inside the main shaft 33. The clutch 2 also includes a push mechanism 43, and the push mechanism 43 includes a short push rod 43a such that at least a portion thereof is inserted into the through hole 33a to push the first pressing plate 102 to the right when the clutch is disengaged. The oil supply path 110 which supplies oil to the sub clutch 100 is formed within the short push rod 43a.

As described above, according to the first embodiment of the present invention, oil can be supplied directly to the sub clutch 100 through the oil supply path 110. That is, not only oil dispersed in the crankcase 31 is supplied to the sub clutch 100, but also oil can be directly supplied to the sub clutch 100 through the oil supplying path 110. Therefore, since sufficient amount of oil can be supplied to the sub clutch 100, abrasion of the sub clutch 100 can be suppressed.

In the clutch 2 according to the first embodiment of the present invention, the power-assist mechanism 200 comprises a ball cam. Therefore, the power-assist mechanism 200 can be reduced in size. The power-assist mechanism 200 is not limited to a ball cam configuration. Other suitable power-assist configurations may be employed.

The clutch 2 according to the present embodiment is a multi-plate type clutch in which a plurality of friction plates 64 and a plurality of clutch plates 65 are alternately disposed. However, the clutch 2 may be a single-plate type clutch including a single friction plate and a single clutch plate or a friction clutch of another type which transmits drive force with frictional force. However, a multi-plate type clutch is typically larger in clutch capacity than a single-plate type clutch. In other words, the drive force transmitted through the clutch is larger. Therefore, reducing the operational load required to disengage the clutch and the shift shock occurring when the clutch 2 is engaged in an idling state is advantageously obtained.

Modification of First Embodiment

According to the above-described embodiment, in the idling state in which the rotational speed of the crankshaft is low, the clutch is set to a state in which the pressure plate 77 does not press the plate group 66 into contact with each other; that is, the clutch is in a disengaged state at a low speed such as an idling speed. However, the biasing force applied by the disc spring 83 and the coil spring 205 may be adjusted such that even in the idling state or the like in which the rotational speed is low, the clutch can be set to a state in which the pressure plate 77 presses the plate group 66 into frictional contact. In other words, the biasing force may be adjusted such that the clutch can be set to a so-called partially-applied clutch state.

Second Embodiment

Configuration of Clutch

A clutch 2 according to a second embodiment comprises a wet multi-plate type friction clutch. The clutch 2 according to the present embodiment is engaged/disengaged by a clutch lever 24 (FIG. 1) operated by a rider. However, the clutch 2 according to the present embodiment does not include a roller weight, such as roller weights 41 shown in FIG. 3 and described in reference to the first embodiment of the present invention.

The configuration of a clutch 2 according to the second embodiment will be described below in detail with reference to FIGS. 6, 7a, 7b, and 7c. In the first and second embodiments, like reference numerals denote like components, and thus duplicated description will not be repeated.

Pressure Plate 77

Figure 6:
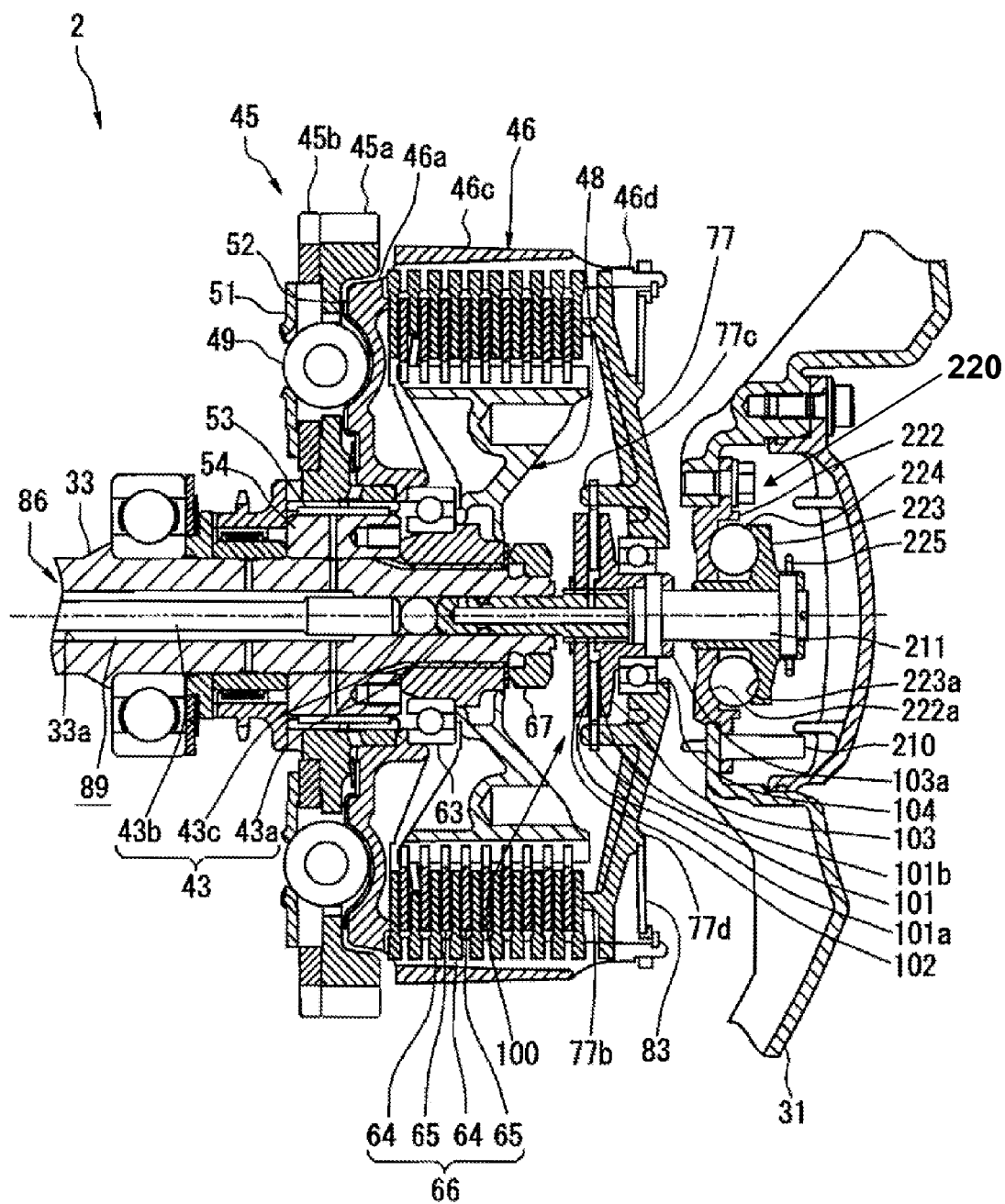
FIG. 6 is a cross-sectional view illustrating a clutch according to a second embodiment of the present invention.

As shown in FIG. 6, a pressure plate 77 is disposed on the right side of the main shaft 33. The pressure plate 77 has a substantially disc-like shape. A sub clutch 100, which will be described later, is provided adjacent a central portion of pressure plate 77. The outer circumference of the pressure plate 77 is engaged with arms 46d of clutch housing 46. Therefore, the pressure plate 77 is unable to rotate with respect to the clutch housing 46 but it rotates together with the clutch housing 46.

A pressing portion 77b which protrudes toward the plate group 66 is formed on an outer portion of the pressure plate 77 in the radial direction. The pressing portion 77b is opposed to the right most friction plate 64 in the plate group 66. As the pressure plate 77 moves left, the pressing portion 77b presses the plate group 66 to the left. As a result, the friction plates 64 and the clutch plates 65 of the plate group 66 are pressed into frictional contact with each other.

In addition, as depicted in FIG. 6, the pressure plate 77 has one or more slide arms 77c which protrude toward the plate group 66 and are positioned radially inward of the pressing portion 77b. A friction plate 101 of sub clutch 100 is configured to slidably engage with the one or more slide arms 77c in an axial direction of the main shaft 33.

Figure 8B:
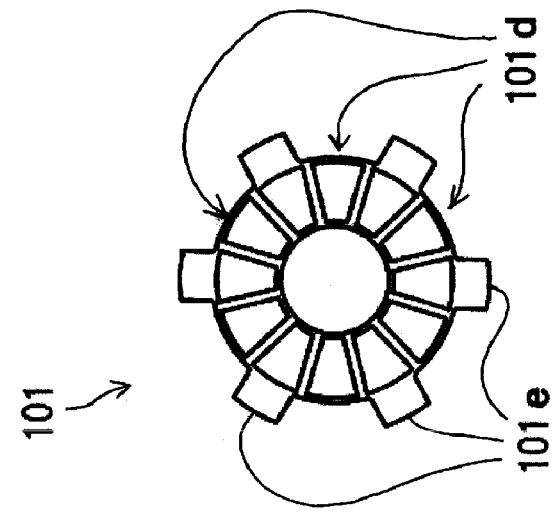
FIG. 8b is a front view of a friction plate according to the second embodiment of the present invention.
Figure 8A:
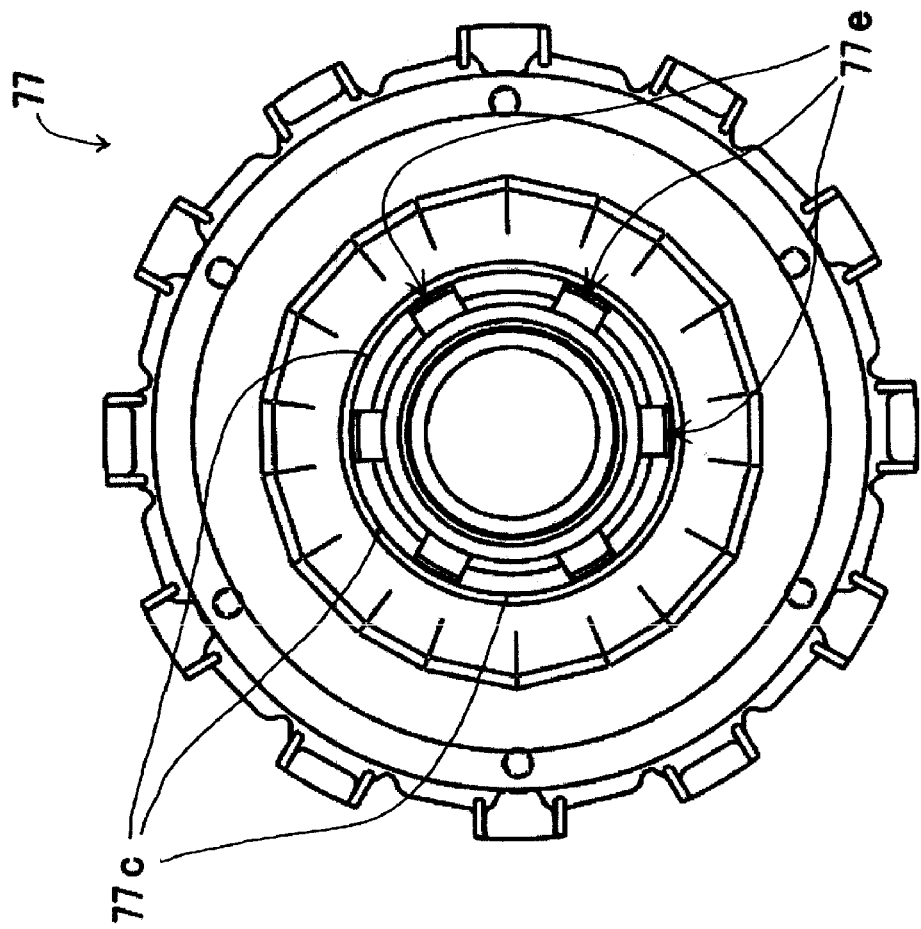
FIG. 8a is a front view of a pressure plate according to the second embodiment of the present invention.

One example of a pressure plate 77 according to the present embodiment that includes a plurality of slide arms 77c is shown in FIG. 8(a). A groove 77e is formed between neighboring slide arms 77c. Slide arms 77c are provided at regular intervals in a circumferential direction with each of the slide arms 77c having the same width. Therefore, a plurality of grooves 77e are also formed at regular intervals in a circumferential direction. However, the plurality of slide arms 77c may have different widths from each other in a circumferential direction.

As shown in FIG. 8(b), the friction plate 101 includes a plurality of stoppers 101e. Stoppers 101e extend radially outward from a central portion of the friction plate 101 and are provided at regular intervals in a circumferential direction. As seen in FIG. 8(b), stoppers 101e may have the same width with each other in a circumferential direction. In addition, a groove 101d is formed between neighboring stoppers 101e. However, the plurality of stoppers 101e may be configured to have different widths in a circumferential direction.

Each stopper 101e of friction plate 101 is configured to fit into a corresponding groove 77e of the pressure plate 77. The friction plate 101, therefore, is slideable with respect to the pressure plate 77 in the axial direction of main shaft 33. In other words, the friction plate 101 slides with respect to the pressure plate 77 in a direction which extends in an orthogonal direction with respect to FIG. 8.

When viewed in longitudinal section, each half of pressure plate 77 extends generally linearly from pressing portion 77b to slide arm 77c. Thus, the pressure plate 77 does not have a bent or curved portion between the pressing portion 77b and the slide arm 77c. Therefore, the pressure plate 77 has a relatively simple shape at least between the pressing portion 77b and the slide arm 77c. The structure of the clutch 2 is thereby further simplified. In addition, since the pressure plate 77 does not have a bent or curved portion between the pressing portion 77b and the slide arm 77c in a longitudinal section, the pressure plate 77 does not have to extend unnecessarily in the axial direction (of the main shaft 33). Therefore, it is possible to make the clutch 2 compact in an axial direction of the main shaft 33.

The longitudinal section referred to above is a cross section by a plane containing a rotational center of the pressure plate 77.

A disc spring 83 is provided on the right side of the pressure plate 77. In other words, the disc spring 83 is disposed at an opposite side of the plate group 66 with reference to the pressure plate 77 in an axial direction of the main shaft 33. Here, the pressure plate 77 includes a retainer portion 77d which is disposed radially between the pressing portion 77b and slide arms 77c. The retainer 77d protrudes toward the disc spring 83. Thus, in the illustrated embodiment, the retainer 77d protrudes from a surface of the pressure plate 77 opposite to the side that faces the plate group 66 and protrudes away from the plate group 66.

The disc spring 83 is formed in a substantially disc-like shape. One end of disc spring 83 (in a radial direction) is supported by the retainer portion 77d, while the other end is supported by the arms 46d of the clutch housing 46.

Power-Assist Mechanism

The clutch 2 according to the present embodiment includes a power-assist mechanism 220, as shown in reference to FIG. 6. The power-assist mechanism 220 converts part of the torque of the pressure plate 77 into force for disengaging the clutch 2 and decreases the force necessary for disengaging the clutch 2. The power-assist mechanism 220 according to the present embodiment comprises a ball cam. Specifically, power-assist mechanism 220 includes a slide shaft 211 which is fixed to a second pressing plate 103 of sub clutch 100, a first cam plate 222, a second cam plate 223, and a plurality of balls 224.

In the present embodiment, power-assist mechanism 220 has three balls 224. The three balls 224 are disposed between the first cam plate 222 and the second cam plate 223 which are opposed to each other so that the balls 224 can roll freely between the first cam plate 222 and the second cam plate 223. The three balls 224 are disposed at regular intervals along a circumferential direction around the longitudinal axis of the slide shaft 211. However, the number of balls 224 provided in the power-assist mechanism 220 is not limited to three. Other ball implementations may be utilized, as needed. Each ball 224 can move along an imaginary curve (the dashed-dotted curve shown in FIGS. 7a-7c), as described later.

Figure 7C:
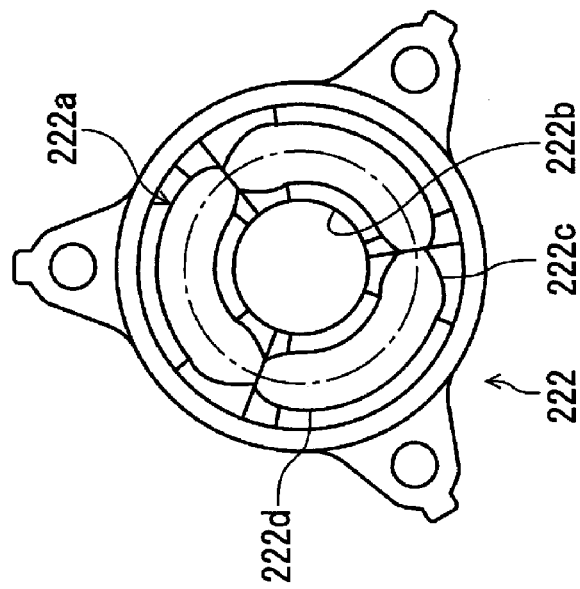
FIG. 7c is a front view illustrating the first cam plate.
Figure 7B:
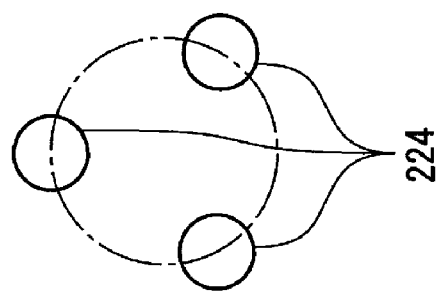

The first cam plate 222 and the second cam plate 223 have a substantially disc-like shape. As shown in FIG. 7(c), a through hole 222b is formed at a central portion of the first cam plate 222. As shown in FIG. 6, the slide shaft 211 is inserted through the through hole 222b. The slide shaft 211 can freely move in the axial direction and rotate freely with respect to the first cam plate 222. That is, the first cam plate 222 is configured not to rotate even though the slide shaft 211 rotates. In addition, the first cam plate 222 is configured not to move even though the slide shaft 211 moves in the axial direction.

Figure 7A:
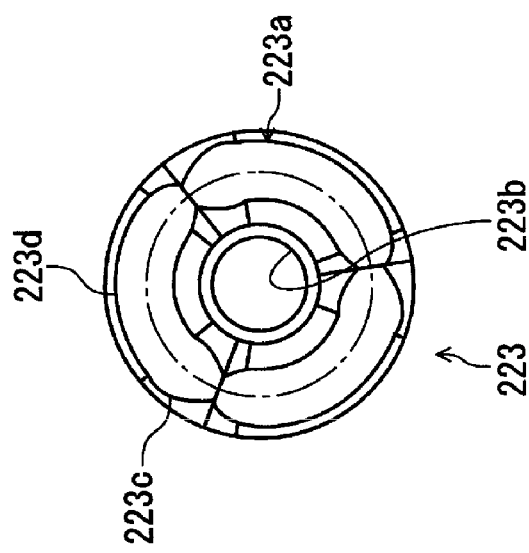
FIG. 7a is a rear view illustrating a second cam plate of a power-assist mechanism according to the second embodiment of the present invention.

As shown in FIG. 7(a), a serrated hole 223b is formed at a central portion of the second cam plate 223. The second cam plate 223 is fitted onto the slide shaft 211 via a matching serrated surface on the slide shaft 211. Therefore, the second cam plate 223 can move freely in an axial direction with respect to the slide shaft 211 but is configured to rotate together with the slide shaft 211.

The first cam plate 222 is secured to the crankcase 31 via a plurality of fastening members 210 fixed thereto. Therefore, the first cam plate 222 is fixed with respect to the crankcase 31. In FIG. 6, two fastening members 210 are shown. The number of fastening members 210 is not particularly limited as long as the number is two or more.

A stopper 225 is provided at a terminal end of the slide shaft 211. The second cam plate 223 is fixed to the slide shaft 211 by the stopper 225. That is, the second cam plate 223 and the slide shaft 211 rotate integrally and move integrally in an axial direction.

First cam grooves 222a are formed on a right surface (a front surface in FIG. 7(c)) of the first cam plate 222. A ball receiving groove 222c is formed at one end of each of the first cam grooves 222a. Second cam grooves 223a are formed on a left surface (a front surface in FIG. 7(a)) of the second cam plate 223. A ball receiving groove 223c is formed at one end of each of the second cam grooves 223a. The ball receiving grooves 222c and the ball receiving grooves 223c are disposed relatively deeper (left-right width in FIG. 6) than other portions of the first cam grooves 222a and the second cam grooves 223a, respectively. The other portion of each cam groove 222a, which is shallower (left-right width in FIG. 6) than the ball receiving groove 222c, is shown as a ball moving groove 222d in FIG. 7(c). The other portion of each cam groove 223a which is shallower (left-right width in FIG. 6) than the ball receiving groove 223c is shown as a ball moving groove 223d in FIG. 7(a). The ball moving surfaces are inclined toward the opposing cam plate receiving grooves 222c and 223c, respectively.

The first cam grooves 222a and the second cam grooves 223a are formed so that when the second cam plate 223 rotates in a predetermined direction, each ball 224 moves up onto a ball moving groove 222d and a ball moving groove 223d from the ball receiving groove 222c and the ball receiving groove 223c. By contrast, when the second cam plate 223 rotates in an direction opposite to the predetermined direction, each ball 224 is received between a ball receiving groove 222c and a ball receiving groove 223c. In other words, cam grooves 222a and 223a are formed so that both cam plates 222 and 223 are forced to separate from each other and the second cam plate 223 moves to the right when the second cam plate 223 rotates in a predetermined direction. In addition, both cam grooves 222a and 223a are formed so that the biasing force of the disc spring 83 moves the second cam plate 223 to the left when the second cam plate 223 rotates in a reverse direction.

Operation of Clutch

Next, the operation of the clutch 2 according to the second embodiment will be described. An operation for disengaging the clutch 2 will be first described.

If a rider of the motorcycle 1 grasps the clutch lever 24 (see FIG. 1), the internal pressure of the operating chamber 92 of the drive mechanism 87 is increased. The piston 91 thereby moves to the right, and the long push rod 43b also moves to the right. Then, the ball 43c and the short push rod 43a also move to the right, and the first pressing plate 102 of the sub clutch 100 moves to the right. Thereby, the friction plate 101 of the sub clutch 100 is frictionally sandwiched between the first pressing plate 102 and the second pressing plate 103, so that the sub clutch 100 enters an engaged state. As a result, the slide shaft 211 of the power-assist mechanism 220 rotates along with the pressure plate 77 in a predetermined direction.

If the slide shaft 211 rotates in a predetermined direction, the second cam plate 223 of the power-assist mechanism 220 also rotates in the same direction. Then, the three balls 224 each move up from an opposing ball receiving groove 222c and ball receiving grooves 223c to a ball moving groove 222d and a ball moving groove 223d, and the second cam plate 223 is pressed to the right by the balls 224. Thereby, the slide shaft 211 is also pressed to the right. As a result, the pressure plate 77 moves to the right due to force with which the short push rod 43a pushes the pressure plate 77 to the right via the first pressing plate 102 and the friction plate 101 and the force with which the slide shaft 211 pulls the pressure plate 77 to the right through the second pressing plate 103 and the bearing 104. Accordingly, a pressed-contact state of the plate group 66 is released so that the clutch 2 is disengaged.

Next, an operation for engaging the clutch 2 will be described.

In order to engage the clutch 2, a rider releases the clutch lever 24 which he or she had gripped. As a result, the internal pressure of the operating chamber 92 of the driving mechanism 87 is decreased. Consequently, the piston 91 and the long push rod 43b move to the left. Then, the ball 43c and the short push rod 43a also move to the left, and the first pressing plate 102 of the sub clutch 100 moves to the left. The first pressing plate 102 of the sub clutch 100 is thereby separated from the friction plate 101. In addition, the separation eliminates any rightward force on the second pressing plate 103 from first pressing plate 102 (via friction plate 101). Therefore, the rightward pressing force with respect to the slide shaft 211 disappears.

If a rider releases the clutch lever 24 which he or she had gripped, the pressure plate 77 moves to the left by the biasing force of the disc spring 83. Here, the second pressing plate 103 and the pressure plate 77 are configured to move integrally in an axial direction. Therefore, as the pressure plate 77 moves to the left, the second pressing plate 103 also moves to the left. In addition, as described above, the slide shaft 211 is fixed to the second pressing plate 103. Therefore, as the second pressing plate 103 moves to the left, the slide shaft 211 also moves to the left along with the second pressing plate 103.

When the second cam plate 223 and the slide shaft 211 move to the left, the second cam plate 223 rotates in the reverse direction to the predetermined direction. At this time, balls 224 move from being on opposing inclined portions of ball moving grooves 222d and ball moving grooves 223d to being received between the ball receiving grooves 222c and the ball receiving grooves 223c, respectively.

As the pressure plate 77 moves to the left under the biasing force of the disc spring 83, the pressure plate 77 presses the plates of plate group 66 into contact with each other, so that the clutch 2 is engaged. At this time, the friction plate 101 of the sub clutch 100 is separated from the second pressing plate 103.

As described above, the clutch 2 according to the first and second embodiments of the present invention includes the clutch housing 46, the clutch boss 48, the main shaft 33, the pressure plate 77, the power-assist mechanism, the friction plate 101, the first pressing plate 102, the second pressing plate 103, the short push rod 43a, and the clutch lever 24. Here, the power-assist mechanism represents either of the power-assist mechanism 200 or the power-assist mechanism 220 of FIGS. 3 and 6, respectively.

The clutch housing 46 includes the friction plates 64 and is configured to rotate in response to rotation of the crankshaft 32 of the engine 4. The clutch boss 48 includes the clutch plates 65 which are opposed to the friction plates 64 in the axial direction of the clutch housing 46 and is rotatable upon receiving rotation of the clutch housing 46. The main shaft 33 is connected to the clutch boss 48 and rotates together with the clutch boss 48. The pressure plate 77 is engaged to the clutch housing 46, is movable in axial direction with respect to the clutch housing 46 and is rotatable together with the clutch housing 46.

The pressure plate 77 moves to the left to press the friction plates 64 and the clutch plates 65 into frictional contact with each other. The power-assist mechanism receives torque from the pressure plate 77 and converts the torque into a force that moves the pressure plate 77 in a direction in which the friction plate 64 and the clutch plate 65 separate from each other when the clutch 2 is disengaged. The friction plate 101 is configured to rotate together with the pressure plate 77 and includes the first friction surface 101a formed at a left side and a second friction surface 101b formed at a right side.

The first pressing plate 102 comes into contact with the first friction surface 101a of friction plate 101 and presses the friction plate 101 from left to right when the clutch 2 is disengaged. The second pressing plate 103 is disposed opposite to the second friction surface 101b of the friction plate 101. The second pressing plate 103 is pressed into contact with the friction plate 101, which is pressed by the first pressing plate 102, to receive torque from the pressure plate 77 and transmits the torque to the power-assist mechanism when the clutch 2 is disengaged. The short push rod 43a moves the first pressing plate 102 from left to right when the clutch 2 is disengaged. The clutch lever 24 operates the short push rod 43a to move the first pressing plate 102 from left to right when the clutch 2 is disengaged.

In the clutch 2 according to the first and second embodiments of the present invention, the friction plate 101 is configured to rotate together with the pressure plate 77. The pressure plate 77 is coupled to the clutch housing 46, is movable in an axial direction with respect to the clutch housing 46, and is rotatable together with the clutch housing 46. The clutch housing 46 rotates by means of rotation of the crankshaft 32 of the engine 4. Therefore, the clutch 2 according to the first and second embodiments of the present invention transmits rotation of the crankshaft 32 of the engine 4 to the friction plate 101 only through the clutch housing 46 and the pressure plate 77. That is, by using the clutch 2 of the present invention, the shape between the pressure plate 77 and the friction plate 101 can be simplified in constituting a transmission path between the pressure plate 77 and the sub clutch 100. Therefore, according to the first and second embodiments of the present invention, a friction clutch that can simplify the structure thereof and reduce the operational load necessary for disengaging the clutch can be provided.

The slide arms 77c is formed in the pressure plate 77. In the second embodiment of the present invention, as shown in FIG. 6, the slide arms 77c protrude toward the plate group 66. That is, the slide arms 77c do not protrude rightward. Therefore, a protruding portion of the slide arm 77c does not enlarge the width of the clutch 2. The friction plate 101 is slidably engaged with the slide arms 77c. The friction plate 101 can thereby rotate together with the pressure plate 77.

As described above, the present invention can be applied to a friction clutch and a vehicle equipped with the same.

It is to be clearly understood that the above description was made only for purposes of an example and not as a limitation on the scope of the invention as claimed herein below.

What is claimed:

1. A friction clutch for transmitting torque from a crankshaft of an engine to a transmission, the clutch comprising:
   a drive side rotating body which has a first plate and an axis of rotation, and which is configured to rotate in response to rotation of the crankshaft;
   a driven side rotating body arranged coaxially with the drive side rotating body and having a second plate opposite to the first plate in a predetermined direction along the axis of rotation, the driven side rotating body receiving torque from the drive side rotating body causing it to rotate when the clutch is engaged;
   a pressure plate supported on the drive side rotating body so as to be movable in an axial direction with respect to the drive side rotating body and so as to rotate together with the drive side rotating body, wherein a slide arm is formed in the pressure plate;
   an elastic member urging the pressure plate in the predetermined direction to press the first plate and the second plate into frictional contact with each other when the clutch is engaged;
   a power-assist mechanism configured to receive torque of the pressure plate and convert the received torque into a force for moving the pressure plate in a direction for separating the first plate and the second plate from each other when the clutch is disengaged; and
   a sub clutch configured to transmit torque from the pressure plate to the power-assist mechanism, the sub clutch comprising:
      a friction plate configured to rotate together with the pressure plate, the friction plate having a first friction surface formed on one side and a second friction surface formed on the other side, wherein the friction plate is slidably engaged with the slide arm of the pressure plate;
      a pressing member adapted to come into contact with the first friction surface to press the friction plate from the first side toward the second side when the clutch is to be disengaged; and
      a torque transmission member disposed opposite to the second friction surface of the friction plate and being placed in frictional contact with the friction plate by the pressing member to receive torque of the pressure plate when the clutch is disengaged, the torque transmission member transmitting the received torque to the power-assist mechanism;
      an operating shaft arranged to move the pressing member toward the friction plate; and
      a device which operates the operating shaft to move the pressing member toward the friction plate.

2. The friction clutch of claim 1, further comprising a rotatable shaft which is coaxially connected to the driven side rotating body and rotates together with the driven side rotating body.

3. The friction clutch of claim 2, wherein an axial through-hole is formed in the rotatable shaft, the operating shaft being at least partially inserted into the aperture of the rotatable shaft.

4. The friction clutch of claim 3, wherein an oil supply path for the sub clutch is formed inside the operating shaft.

5. The friction clutch of claim 1, wherein the power-assist mechanism comprises a ball cam.

6. The friction clutch of claim 1, wherein the drive side rotating body includes a plurality of first plates, the driven side rotating body includes a plurality of second plates, and the plurality of first plates and the plurality of second plates are alternately disposed in the predetermined direction.

7. A vehicle comprising the friction clutch of claim 1.

8. The friction clutch of claim 5, wherein
   the torque transmission member of the sub clutch includes a slide shaft; and
   the ball cam includes a first cam plate, a second cam plate disposed opposite the first cam plate, and a plurality of balls interposed between the first cam plate and the second cam plate, wherein each ball is disposed between opposing cam surfaces formed in the first and second cam plate, respectively.

9. The friction clutch of claim 8, wherein a through hole is formed at a central portion of the first cam plate, the slide shaft being inserted through the through hole so that the slide shaft can move freely in the axial direction and rotate freely with respect to the first cam plate.

10. The friction clutch of claim 9, wherein the second cam plate is connected to the slide shaft so that it rotates together with the slide shaft and is axially moveable with the slide shaft.

11. The friction clutch of claim 9, wherein cam surfaces on the first and second cam plates are formed so that when torque is transmitted by the slide shaft to the second cam plate, the second cam plate is forced away from the first cam plate in the axial direction.

* * * * *